US011967266B2

United States Patent
(12) United States Patent
Zhang et al.

(10) Patent No.: US 11,967,266 B2
(45) Date of Patent: Apr. 23, 2024

(54) MOG CIRCUIT AND DISPLAY PANEL

(71) Applicant: Wuhan China Star Optoelectronics Technology Co., Ltd., Hubei (CN)

(72) Inventors: Dian Zhang, Hubei (CN); Ronglei Dai, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 806 days.

(21) Appl. No.: 17/051,443

(22) PCT Filed: Aug. 28, 2020

(86) PCT No.: PCT/CN2020/111996

§ 371 (c)(1),
(2) Date: Oct. 29, 2020

(87) PCT Pub. No.: WO2021/258539

PCT Pub. Date: Dec. 30, 2021

(65) Prior Publication Data

US 2023/0343270 A1 Oct. 26, 2023

(30) Foreign Application Priority Data

Jun. 24, 2020 (CN) ......................... 202010591035.2

(51) Int. Cl.
*G09G 3/20* (2006.01)

(52) U.S. Cl.
CPC ... *G09G 3/2092* (2013.01); *G09G 2310/0267* (2013.01)

(58) Field of Classification Search
CPC ..................... G09G 3/2092; G09G 2310/0267
See application file for complete search history.

(56) References Cited

U.S. PATENT DOCUMENTS

| | | | | |
|---|---|---|---|---|
| 2009/0002355 | A1 | 1/2009 | Iwatsu | |
| 2011/0187691 | A1* | 8/2011 | Chung | G09G 5/00 345/204 |
| 2014/0159799 | A1 | 6/2014 | Chen et al. | |
| 2014/0223477 | A1 | 8/2014 | Han et al. | |
| 2015/0295575 | A1* | 10/2015 | Lee | H03K 17/6872 327/416 |
| 2017/0061855 | A1* | 3/2017 | Tsai | G09G 3/2092 |
| 2017/0061890 | A1* | 3/2017 | Zhou | G09G 3/3275 |
| 2017/0069280 | A1* | 3/2017 | Xu | G09G 3/20 |
| 2017/0102805 | A1 | 4/2017 | Xiao et al. | |
| 2018/0069515 | A1* | 3/2018 | Inoue | H03K 19/018507 |
| 2018/0091121 | A1* | 3/2018 | Yamamoto | G11C 19/28 |

(Continued)

FOREIGN PATENT DOCUMENTS

| | | |
|---|---|---|
| CN | 102184716 | 9/2011 |
| CN | 102222489 | 10/2011 |

(Continued)

*Primary Examiner* — Ibrahim A Khan

(57) ABSTRACT

A MOG circuit and a display panel are provided. The MOG circuit controls the current-stage MOG circuit through the first node signal to block the input of the MUX signal. At the same time, the MOG circuit controls the current-stage MUX circuit through the second node signal such that the voltage level of the scan signal is pulled down to the voltage level of the first low voltage level signal. In this way, all the scan signals could satisfy the turn-off stage while the MUX circuit has a lower loading capability.

15 Claims, 4 Drawing Sheets

(56) References Cited

U.S. PATENT DOCUMENTS

| | | | | |
|---|---|---|---|---|
| 2019/0189232 | A1* | 6/2019 | Wang | G09G 3/3266 |
| 2023/0040448 | A1* | 2/2023 | Zhang | G09G 3/2092 |

FOREIGN PATENT DOCUMENTS

| | | |
|---|---|---|
| CN | 103187030 | 7/2013 |
| CN | 104103321 | 10/2014 |
| CN | 104599621 | 5/2015 |
| CN | 105047122 | 11/2015 |
| CN | 105206237 | 12/2015 |
| CN | 106486043 | 3/2017 |
| CN | 108010480 | 5/2018 |
| CN | 111048051 | 4/2020 |
| CN | 111223433 | 6/2020 |
| WO | WO 2018/173281 | 9/2018 |

* cited by examiner

MOG CIRCUIT AND DISPLAY PANEL

RELATED APPLICATIONS

This application is a National Phase of PCT Patent Application No. PCT/CN2020/111996 having International filing date of Aug. 28, 2020, which claims the benefit of priority of Chinese Patent Application No. 202010591035.2 filed on Jun. 24, 2020. The contents of the above applications are all incorporated by reference as if fully set forth herein in their entirety.

FIELD AND BACKGROUND OF THE INVENTION

The present invention relates to a display technology, such as an MOG driving technique, and more particularly, to a MOG circuit and a display panel.

Conventionally, the scan signal outputted by an MOG (MUX on Gate) circuit, a combination of a GOA (gate driver on array) circuit and a MUX circuit, is related to the received MUX signal. When a scan signal corresponding to a turn-off state (the all-gate-off function) should be outputted, the MUX signal is often used to adjust the voltage level of the scan signal to the right level. However, the size of thin film transistors (TFT) in the MUX circuit is limited, which also limits the amount of charges that could be handled by the TFT.

When the all-gate-on function is implemented, the MUX signal needs to be transformed from a high voltage level to a low voltage level. But such an operation is limited by the loading capability of the MUX circuit. If the scan signal cannot reach the required level of the turn-off state, the all-gate-off function cannot be achieved.

SUMMARY OF THE INVENTION

One objective of an embodiment of the present invention is to provide a MOG circuit and a display panel to solve the above-mentioned issue, where the voltage level of the scan signal is not low enough for the turn-off state because of the unsatisfactory loading capability.

According to an embodiment of the present invention, an MOG circuit having a plurality of cascaded MOG sub-circuits is disclosed. One of the cascaded MOG sub-circuits comprises: a current-stage GOA circuit, configured to generate a first node signal and a second node signal; and a current-stage MUX circuit, connected to the current-stage GOA circuit, a first low voltage level signal and a MUX signal, configured to control the MUX signal according to the first node signal and/or the second node signal to output a scan signal; wherein when the MOG circuit outputs the scan signal of a turn-off state, the first node signal controls the current-stage MUX circuit to stop inputting the MUX signal and the second node signal controls the current-stage MUX circuit to pull down a voltage level of the scan signal to a voltage level of the first low voltage level signal.

In an embodiment of the present disclosure, the current-stage MUX circuit comprises at least two MUX units connected in parallel; a first input end of the MUX unit is connected to the MUX signal; a second input end of the MUX unit is connected to the first low voltage level signal; a first control end of the MUX unit is connected to the first node signal; a second control end of the MUX unit is connected to the second node signal; and an output end of the MUX unit is configured to the scan signal.

In an embodiment of the present disclosure, the current-stage GOA circuit is connected to a second low voltage level signal; and the voltage level of the first low voltage level signal is identical to or different from a voltage level of the second low voltage level signal.

In an embodiment of the present disclosure, the current-stage GOA circuit comprises: a first global control unit, configured to pull down a voltage level of the first node signal to a voltage level of the second low voltage level signal according to a first global control signal, the first global control unit comprising: a first end, connected to the first node signal; a second end, connected to the second node signal; and a control end, connected to the first global control signal.

In an embodiment of the present disclosure, the current-stage MOG circuit comprises: a second global control unit, configured to pull up a voltage level of the first node signal to a voltage level of a second global control signal according to the second global control signal, the second global control unit comprising: an input end, connected to the second global control signal; and a control end, connected to the second global control signal.

In an embodiment of the present disclosure, the current-stage GOA circuit comprises: a cascading unit, configured to control an output of a high voltage level signal according to the first node signal of a corresponding stage, the cascading unit comprising: an input end, connected to a high voltage level signal; and a control end, connected to the first node signal of the corresponding stage.

In an embodiment of the present disclosure, the current-stage GOA circuit further comprises: a first generating unit, configured to generate the first node signal, the first generating unit comprising: an input end, connected to a current-stage clock signal; an output end, connected to the first node signal; and a control end, connected to an output end of the cascading unit.

In an embodiment of the present disclosure, the current-stage GOA circuit further comprises: a second generating unit, configured to generate the second node signal, the second generating unit comprising: an input end, connected to a third global control signal; a control end, connected to a clock signal of a corresponding stage; and an output end, connected to the second node signal.

In an embodiment of the present disclosure, the current-stage GOA circuit further comprises: a first pull-down unit, configured to pull down a voltage level of the output end of the cascading unit to a voltage level of the second low voltage level signal, the first pull-down unit comprising: a first end, connected to the second low voltage level signal; a second end, connected to the output end of the cascading unit; and a control end, connected to the second node signal.

In an embodiment of the present disclosure, the second pull-down unit comprises a ninth TFT; an input end of the ninth TFT is connected to the second low voltage level signal; an output end of the ninth TFT is connected to the output end of sixth TFT, the gate of the first TFT, the output end of the third TFT and the output end of the fourth TFT; and a gate of the ninth TFT is connected to the output end of the seventh TFT.

In an embodiment of the present disclosure, the current-stage GOA circuit further comprises: a second pull-down unit, configured to pull down a voltage level of the first node signal to a voltage level of the second low voltage level signal, the second pull-down unit comprising: a first end, connected to the second low voltage level signal; a second end, connected to the first node signal; and a control end, connected to the second low voltage level signal.

According to an embodiment of the present invention, a display panel is disclosed. The display panel comprises the above-mentioned MOG circuit.

The MOG circuit controls the current-stage MOG circuit through the first node signal to block the input of the MUX signal. At the same time, the MOG circuit controls the current-stage MUX circuit through the second node signal such that the voltage level of the scan signal is pulled down to the voltage level of the first low voltage level signal. In this way, all the scan signals could satisfy the turn-off stage while the MUX circuit has a lower loading capability.

BRIEF DESCRIPTION OF THE SEVERAL VIEWS OF THE DRAWINGS

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

DESCRIPTION OF SPECIFIC EMBODIMENTS OF THE INVENTION

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Figure 1:
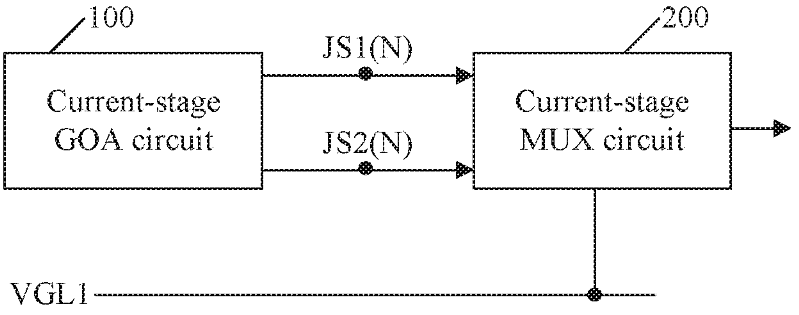
FIG. 1 is a functional block diagram of a MOG circuit according to an embodiment of the present invention.

As shown in FIG. 1, a MOG circuit is disclosed according to an embodiment of the present invention. The MOG circuit comprises a plurality of cascaded MOG sub-circuits. One of the cascaded MOG sub-circuits comprises a current-stage GOA circuit 100 and a current-stage MUX circuit 200. The current-stage circuit 100 is configured to generate a corresponding first node signal JS1(N) and a corresponding second node signal JS2(N). The current-stage MUX circuit 200 is connected to the current-stage GOA circuit 100, the first low voltage level signal VGL1 and the MUX signal and is configured to control the MUX signal according to the first node signal JS1(N) and/or the second node signal JS2(N) to output a corresponding scan signal. In this embodiment, when the MOG circuit outputs the scan signal of a turn-off state, the first node signal JS1(N) controls the current-stage MUX circuit 200 to stop inputting the MUX signal and the second node signal JS2(N) controls the current-stage MUX circuit 200 to pull down a voltage level of the scan signal to a voltage level of the first low voltage level signal VGL1.

The MOG circuit controls the current-stage MUX circuit 200 through the first node signal JS1(N) to block the input of the MUX signal. At the same time, the MOG circuit controls the current-stage MUX circuit 200 through the second node signal JS2(N) to pull down the voltage level of the scan signal to the voltage level of the first low voltage signal VGL1. In this way, all the scan signals could be low enough to satisfy the turn-off state under the condition that the MUX circuit has a lower loading capability. Thus, even if the MUX circuit has a heavy load, the display panel could still be normally driven.

Figure 2:
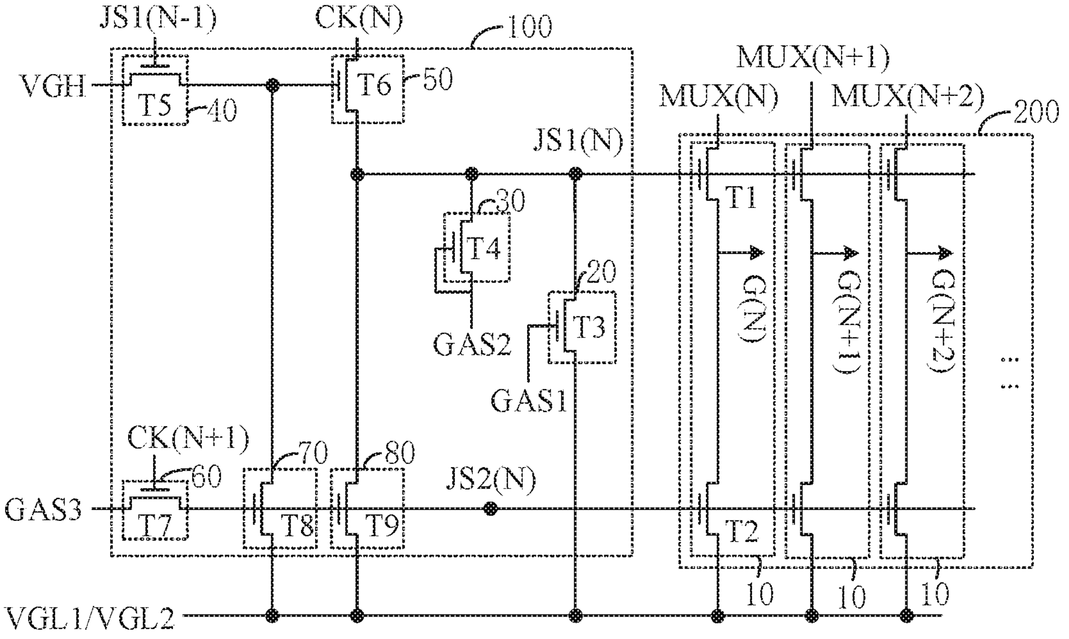
FIG. 2 is a diagram of a MOG circuit according to a first embodiment of the present invention.

As shown in FIG. 2, in one embodiment, the current-stage MUX circuit 200 comprises at least two MUX units 10 connected in parallel. The first input end of the MUX unit 10 is connected to the MUX signal. The second input end of the MUX unit 10 is connected to the first low voltage level signal VGL1. The first control end of the MUX unit 10 is connected to the first node signal JS1(N). The second control end of the MUX unit 10 is connected to the second node signal JS2(N). The output end of the MUX unit 10 is configured to output the corresponding scan signal.

Each of the MUX units 10 could comprise the first TFT T1 and the second TFT T2. The input of the first TFT T1 is connected to the corresponding MUX signal. The output end of the first TFT T1 is connected to the input end of the second TFT T2 and the output end of the first TFT T1 is used as an input node of one of the scan signals. The output end of the second TFT T2 is connected to the first low voltage signal VGL1. The first node signal JS1(N) is connected to the gate of the first TFT T1. The second node signal JS2(N) is connected to the gate of the second TFT T2.

The number of the MUX units 10 in the current-stage MUX circuit 200 could be 2 but not limited to be 2. It could be 3, 6, 9, or 12. This number could be adjusted according to the actual demands.

For example, when the current-stage MUX circuit 200 comprises 3 MUX units. The first MUX unit 10 receives an $N^{th}$-stage MUX signal MUX(N) and correspondingly outputs an $N^{th}$-stage scan signal G(N). The second MUX unit 10 receives the $(N+1)^{th}$-stage MUX signal MUX(N+1) and correspondingly outputs the $(N+1)^{th}$-stage scan signal G(N+1). The third MUX unit 10 receives the $(N+2)^{th}$-stage MUX signal MUX(N+2) and correspondingly outputs the $(N+2)^{th}$-stage scan signal G(N+2).

Figure 3:
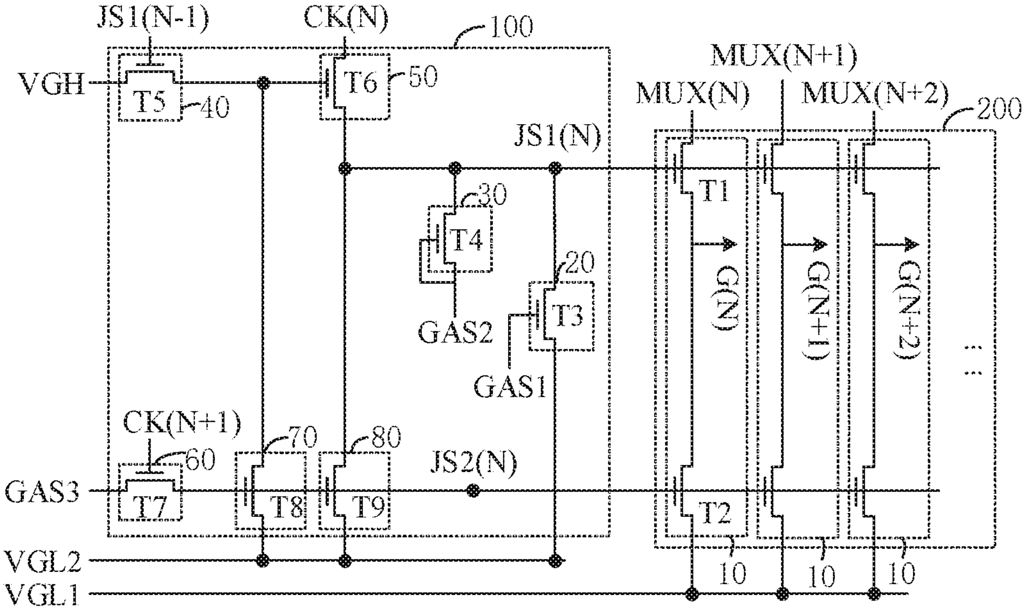
FIG. 3 is a diagram of a MOG circuit according to a second embodiment of the present invention.

As shown in FIG. 2 and/or FIG. 3, the current-stage GOA circuit 100 is connected to the second low voltage level signal VGL2. The first low voltage level signal VGL1 and the second low voltage level signal VGL2 are the same or different.

If the first low voltage level signal VGL1 and the second low voltage level signal VGL2 are the same, this means that the current-stage GOA circuit 100 and the current-stage MUX circuit 200 use the same low voltage level signal. This could reduce the number of signals in the MOG circuit. If the first low voltage level signal VGL1 and the second low voltage level signal VGL2 are different, this means the current-stage MUX circuit 200 and the current-stage GOA circuit 100 respectively use the first low voltage level signal VGL1 and the second low voltage level signal VGL2. Because the two circuits respectively use two independent low voltage level signals, it could reduce the interference between the two circuits and thus prevent from influencing the operation of the MOG circuit. This could improve the reliability of the MOG circuit.

As shown in FIG. 3, the current-stage GOA circuit 100 comprises a first global control unit 20. The first end of the first global control unit 20 is connected to the first node signal JS1(N). The second end of the first global control unit 20 is connected to the second node signal JS2(N). The control end of the first global control unit 20 is connected to the first global control signal GAS1. The first global control unit 20 is configured to pull down the voltage level of the first node signal to the voltage level of the second low voltage level signal VGL2 according to the first global control signal GAS1.

The first global control unit 20 comprises a third TFT T3. The input end of the third TFT T3 is connected to the second low voltage level signal VGL2. The output end of the third TFT T3 is connected to the first node signal JS1(N). The control end of the third TFT is connected to the first global control signal GAS1.

As shown in FIG. 3, the current-stage GOA circuit 100 further comprises a second global control unit 30. The second global control signal GAS2 is connected to the input end and the control end of the second global control unit 30. The output end of the second global control unit 30 is connected to the first node signal JS1(N). The second global control unit 30 is configured to pull up the voltage level of the first node signal JS1(N) to the voltage level of the second global control signal GAS2 according to the second global control signal GAS2.

The second global control unit 30 comprises a fourth TFT T4. The output end of the fourth TFT T4 is connected to the first node signal JS1(N). The second global control signal GAS2 is connected to the input end of the fourth TFT T4 and the gate of the fourth TFT T4.

The current-stage GOA circuit 100 further comprises a cascading unit 40. The input end of the cascading unit 40 is connected to a high voltage level signal VGH. The control end of the cascading unit 40 is connected to the first node signal JS1(N) of a corresponding stage. The cascading unit 40 is configured to control the output of the high voltage level signal VGH according to the first node signal JS1(N) of the corresponding stage.

The cascading unit 40 could comprise a fifth TFT T5. The input end of the fifth TFT T5 is connected to the high voltage level signal VGH. The gate of the fifth TFT T5 could be connected to, but not limited to, the previous-stage first node signal JS(N−1). In the actual implementation, the gate of the fifth TFT T5 could be connected to the first node signal JS(N) of another stage.

The current-stage GOA circuit 100 further comprises a first generating unit 50. The input end of the first generating unit 50 is connected to a current-stage clock signal CK(N). The output end of the first generating unit 50 is connected to the first node signal JS1(N). The control end is connected to the output end of the cascading unit. The first generating unit 50 is configured to generate the first node signal.

The first generating unit 50 comprises a sixth TFT T6. The gate of the sixth TFT T6 is connected to the output end of the fifth TFT T5. The input end of the sixth TFT T6 receives the current-stage clock signal CK(N). The output end of the sixth TFT T6 is configured to output the first node signal JS1(N).

The current-stage GOA circuit further comprises a second generating unit 60. The input end of the second generating unit 60 is connected to a third global control signal GAS3. The control end of the second generating unit 60 is connected to a clock signal of a corresponding stage. The output end of the second generating unit 60 is connected to the second node signal JS2(N). The second generating unit 60 is configured to generate the second node signal JS2(N).

The second generating unit 60 could comprise a seventh TFT T7. The input end of the seventh TFT T7 receives the third global control signal GAS3. The gate of the seventh TFT T7 could receive, but not limited to, a previous-stage clock signal CK(N+1). The gate of the seventh TFT T7 could receive a clock signal of another stage. The output end of the seventh TFT T7 is configured to output the second node signal JS2(N).

The current-stage GOA circuit further comprises a first pull-down unit 70. The first end of the first pull-down unit 70 is connected to the second low voltage level signal VGL2. The second end of the first pull-down unit 70 is connected to the output end of the cascading unit 40. The control end of the first pull-down unit 70 is connected to the second node signal JS2(N). The first pull-down unit 70 is configured to pull down the voltage level of the output end of the cascading unit 40 to the voltage level of the second low voltage level signal VGL2.

The first pull-down unit 70 comprises an eighth TFT T8. The input end of the eighth TFT T8 is connected to the second low voltage level signal VGL2. The output end of the eighth TFT T8 is connected to the output end of the fifth TFT T5 and the gate of the sixth TFT T6. The gate of the eighth TFT T8 is connected to the output end of the seventh TFT T7 and the gate of the second TFT T2.

The current-stage GOA circuit 100 further comprises a second pull-down unit 80. The first end of the second pull-down unit 80 is connected to the second low voltage level signal VGL2. The second end of the second pull-down unit 80 is connected to the first node signal JS1(N). The control end of the second pull-down unit 80 is connected to the second low voltage level signal VGL2. The second pull-down unit 80 is configured to pull down the voltage level of the first node signal JS1(N) to the voltage level of the second low voltage level signal VGL2 according to the second low voltage level signal VGL2.

The second pull-down unit 80 comprises a ninth TFT T9. The input end of the ninth TFT T9 is connected to the second low voltage level signal VGL2. The output end of the ninth TFT T9 is connected to the output end of sixth TFT T6, the gate of the first TFT T1, the output end of the third TFT T3 and the output end of the fourth TFT T4. The gate of the ninth TFT T9 is connected to the output end of the seventh TFT T7.

The first to ninth TFTs (T1-T9) in the above embodiments could be N-type TFTs. It could be understood that the first to ninth TFTs (T1-T9) could also be P-type TFTs or any other type of TFTs.

The signals in the above embodiments could correspond to the high voltage level and/or the low voltage level according to the actual demand of the MOG circuit to achieve the applications of the present invention.

Accordingly, the operation of the MOG circuit of an embodiment could comprise following stages:

Normal working stage: The voltage levels of the first global control signal GAS1, the second global control signal GAS2, and the third global control signal GS3 all correspond to an invalid state, which means that the first global control signal GAS1, the second global control signal GAS2, and the third global control signal GS3 cannot be used to control corresponding units to work. At this time, the MOG circuit receives the MUX signal and outputs a corresponding scan signal.

Figure 4:
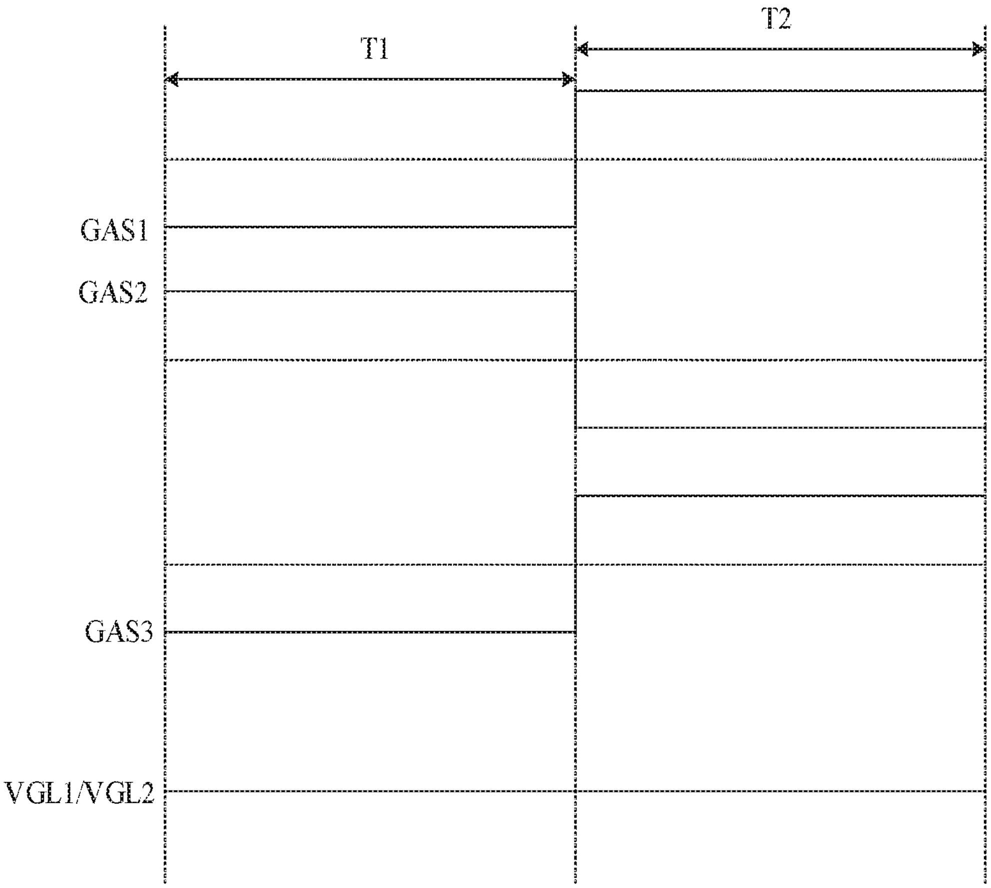
FIG. 4 is a diagram of waveforms of related signals in the MOG circuit according to an embodiment of the present invention.

Black screen wake-up stage: A low power wake-up gesture (LPWG) function is performed. As shown in FIG. 4, the operation of this function comprises two stages: The first stage T1: The voltage level of the second global control signal GAS2 corresponds to a valid state (such as a high voltage level). The second global control unit 30 pulls up the voltage level of the first node signal JS1(N) to turn on all the pixel circuits to perform a blackening operation on the screen. The second stage T2: The scan signals could be adjusted to be a low voltage level (all gate off) to reduce power consumption. At this time, the first global control signal GAS is in the valid stage such that the voltage level of the first node signal JS1(N) could be pulled down through the first global control unit 20 to block the input of the MUX signal. Furthermore, the third global control signal GAS3 is also in the valid state, the second node signal JS2(N) is also in the valid state under the control of the clock signal of the corresponding stage. At this time, the second node signal JS2(N) controls the current-stage MUX circuit 200 to pull down all the scan signals to the voltage level of the first low voltage level signal VGL1/the second low voltage level signal VGL2 to achieve the all-gate-off function.

When the all-gate-off function is being implemented, the voltage levels of the scan signals are not pulled down through the MUX signal to turn off all the scan lines. Instead, the above operation is performed to achieve the all-gate-off function. That is, the current-stage MUX circuit 200 does not need to endure the transformation process of the scan signals. Therefore, the loading condition of the current-stage MUX circuit 200 is alleviated to prevent from influencing the following operations or the gate driving operation. This could make the screen normally display.

In one embodiment, a display panel is disclosed. The display panel comprises a MOG circuit of any of the above embodiments.

Figure 5:
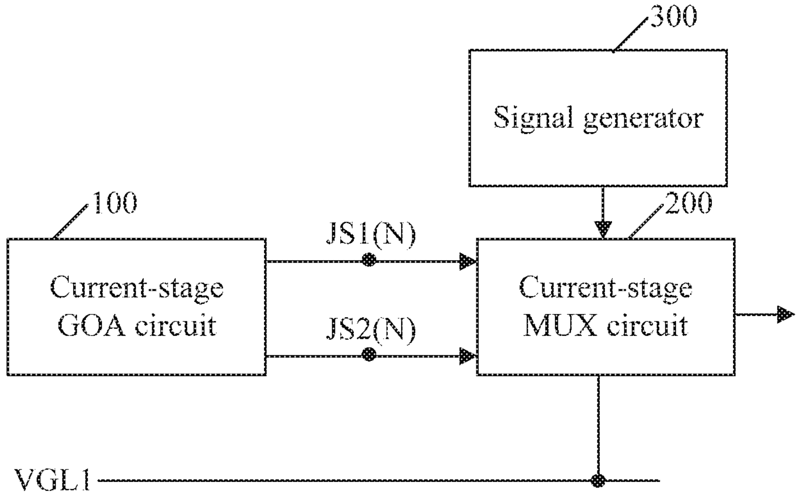
FIG. 5 is a diagram of a display panel according to an embodiment of the present invention.

As shown in FIG. 5, the display panel further comprises a signal generator. The signal generator 300 is connected the current-stage MUX circuit 200 and could provide a corresponding MUX signal. It could be understood that the signal generator 300 could generated the required MUX signal.

From the above, the MOG circuit of an embodiment of the present invention could be integrated, but not limited to, in a gate driving circuit of an array substrate. Also, the MOG circuit could be in a gate driving circuit of a cell phone, a display, a TV. The GOA circuit of the present invention could be used in an LCD or a self-light-emitting display technology, such as an OLED technology.

Above are embodiments of the present invention, which does not limit the scope of the present invention. Any modifications, equivalent replacements or improvements within the spirit and principles of the embodiment described above should be covered by the protected scope of the invention.

What is claimed is:

1. An MOG circuit, having a plurality of cascaded MOG sub-circuits, wherein one of the cascaded MOG sub-circuits comprises:

a current-stage GOA circuit, connected to a second low voltage level signal, configured to generate a first node signal and a second node signal, the current-stage GOA circuit comprising:

a first global control unit, configured to pull down a voltage level of the first node signal to a voltage level of the second low voltage level signal according to a first global control signal, the first global control unit comprising:

a first end, connected to the first node signal;

a second end, connected to the second node signal; and a control end, connected to the first global control signal; and a second global control unit, configured to pull up a voltage level of the first node signal to a voltage level of a second global control signal according to the second global control signal, the second global control unit comprising:

an input end, connected to the second global control signal; and a control end, connected to the second global control signal; and a current-stage MUX circuit, connected to the current-stage GOA circuit, a first low voltage level signal and a MUX signal, configured to control the MUX signal according to the first node signal and/or the second node signal to output a scan signal;

wherein when the MOG circuit outputs the scan signal of a turn-off state, the first node signal controls the current-stage MUX circuit to stop inputting the MUX signal and the second node signal controls the current-stage MUX circuit to pull down a voltage level of the scan signal to a voltage level of the first low voltage level signal.

2. The MOG circuit of claim 1, wherein the current-stage MUX circuit comprises at least two MUX units connected in parallel; a first input end of the MUX unit is connected to the MUX signal; a second input end of the MUX unit is connected to the first low voltage level signal; a first control end of the MUX unit is connected to the first node signal; a second control end of the MUX unit is connected to the second node signal; and an output end of the MUX unit is configured to the scan signal.

3. The MOG circuit of claim 1, wherein the current-stage GOA circuit comprises:

a cascading unit, configured to control an output of a high voltage level signal according to the first node signal of a corresponding stage, the cascading unit comprising:

an input end, connected to a high voltage level signal; and a control end, connected to the first node signal of the corresponding stage.

4. The MOG circuit of claim 3, wherein the current-stage GOA circuit further comprises:

a first generating unit, configured to generate the first node signal, the first generating unit comprising:

an input end, connected to a current-stage clock signal;

an output end, connected to the first node signal; and a control end, connected to an output end of the cascading unit.

5. The MOG circuit of claim 4, wherein the current-stage GOA circuit further comprises:

a second generating unit, configured to generate the second node signal, the second generating unit comprising:

an input end, connected to a third global control signal;

a control end, connected to a clock signal of a corresponding stage; and an output end, connected to the second node signal.

6. The MOG circuit of claim 5, wherein the current-stage GOA circuit further comprises:

a first pull-down unit, configured to pull down a voltage level of the output end of the cascading unit to a voltage level of the second low voltage level signal, the first pull-down unit comprising:

a first end, connected to the second low voltage level signal;

a second end, connected to the output end of the cascading unit; and a control end, connected to the second node signal.

7. The MOG circuit of claim 6, wherein the MUX unit comprises a first TFT and a second TFT; an input end of the first TFT is connected to the MUX signal; an output end of the first FTFT is connected to an input end of the second TFT and is used as an output node of one scan signal; an output end of the second TFT is connected to the first low voltage level signal; the first node signal is connected to a gate of the first TFT; and the second node signal is connected to a gate of the second TFT.

8. The MOG circuit of claim 7, wherein the first global control unit comprises:

a third TFT, having an input end connected to the second low voltage level signal, an output end connected to the first node signal, and a control end connected to the first global control signal.

9. The MOG circuit of claim 8, wherein the second global control unit comprises a fourth TFT; an output end of the fourth TFT is connected to the first node signal; and the second global control signal is connected to an input end of the fourth TFT and a gate of the fourth TFT.

10. The MOG circuit of claim 9, wherein the cascading unit comprises a fifth TFT; an input end of the fifth TFT is connected to the high voltage level signal; and a gate of the fifth TFT is connected to the first node signal.

11. The MOG circuit of claim 10, wherein the first generating unit comprises a sixth TFT; a gate of the sixth TFT is connected to the output end of the fifth TFT; an input end of the sixth TFT receives the current-stage clock signal; and an output end of the sixth TFT is configured to output the first node signal.

12. The MOG circuit of claim 11, wherein the second generating unit comprises a seventh TFT; an input end of the seventh TFT receives the third global control signal; a gate of the seventh TFT receives the clock signal of the corresponding stage; and an output end of the seventh TFT is configured to output the second node signal.

13. The MOG circuit of claim 12, wherein the first pull-down unit comprises an eighth TFT; an input end of the eighth TFT is connected to the second low voltage level signal; an output end of the eighth TFT is connected to the output end of the fifth TFT and the gate of the sixth TFT; and a gate of the eighth TFT is connected to the output end of the seventh TFT and the gate of the second TFT.

14. The MOG circuit of claim 6, further comprising:

a second pull-down unit, configured to pull down a voltage level of the first node signal to a voltage level of the second low voltage level signal, the second pull-down unit comprising:

a first end, connected to the second low voltage level signal;

a second end, connected to the first node signal; and a control end, connected to the second low voltage level signal, wherein the second pull-down unit comprises a ninth TFT; an input end of the ninth TFT is connected to the second low voltage level signal; an output end of the ninth TFT is connected to the output end of sixth TFT, the gate of the first TFT, the output end of the third TFT and the output end of the fourth TFT; and a gate of the ninth TFT is connected to the output end of the seventh TFT.

15. The MOG circuit of claim 14, wherein the ninth TFT is a N-type TFT.

* * * * *